United States Patent Office 3,492,237
Patented Jan. 27, 1970

3,492,237
GLASS COMPOSITION CONTAINING LITHIUM FERRITE CRYSTALS
Peter C. Schultz, Highland Park, N.J., assignor to Research Corporation, New York, N.Y., a nonprofit corporation of New York
No Drawing. Filed June 23, 1966, Ser. No. 559,713
Int. Cl. C04b *35/26;* C03c *3/30;* H01f *1/34*
U.S. Cl. 252—62.61                                   5 Claims

ABSTRACT OF THE DISCLOSURE

A lithium ferrite-containing glass composition is prepared by heating a mixture of silica, sodium oxide and alumina having a mole ratio of 11–13:3–4:1 and 1–10 moles each of ferric oxide and lithium oxide per mole of alumina in an oxidizing atmosphere until glass formation is substantially complete, cooling the fused glass mixture to a temperature below its crystallization point, and growing crystals of lithium ferrite within the glass by heating the glass in air at a temperature between 500 and 900° C.

---

This invention relates to ferrite compositions. More specifically, it relates to a novel lithium ferrite-containing glass composition and to a method for the preparation of such a composition.

Ferrites are magnetic materials useful in various electrical and electronic devices, especially those operable at microwave frequencies. Lithium ferrite crystals exhibit a superior square hysteresis loop even at very high frequencies and are particularly useful for memory cores in high speed computers. I have discovered a novel method for the preparation of small and relatively uniformly sized lithium ferrite crystals in a glass composition.

It is, therefore, an object of the present invention to provide a novel lithium ferrite-containing glass composition.

It is a further object of the invention to provide a convenient method for the preparation of such a composition.

The present invention is a method for the preparation of a lithium ferrite-containing glass composition which comprises heating a mixture of silica, sodium oxide and alumina having a mole ratio of 11–13:3–4:1 and 1–10 moles each of ferric oxide and lithium oxide per mole of alumina in an oxidizing atmosphere until glass formation is substantially complete, cooling the fused glass mixture to a temperature below its crystallization point, and growing crystals of lithium ferrite within the glass by heating the glass in air at a temperature between 500 and 900° C. The present invention also contemplates the resultant lithium ferrite-containing composition.

According to the present invention, lithium ferrite is formed and its crystals are grown within a relatively simple silicate glass. Satisfactory crystal growth depends on the nature of the glass composition as well as the crystallization conditions employed. For example, slight variations in the glass composition will affect the size and yield of the lithium ferrite crystals obtained.

The various glass-and-ferrite forming reactants are ground to a fine powder and intimately mixed prior to heating. As is usual in glass making, the alkali metal oxides, here lithium oxide and sodium oxide, are provided in the form of either their carbonates or nitrates. A ball mill is particularly useful for grinding and mixing the reactants together. The reaction mixture, after thorough mixing, is heated to its fusion temperature, ca. 1420° C., and held at about that temperature for several hours until glass formation and the ferrite producing reaction are substantially complete.

Heating and fusion is effected in an oxidizing atmosphere in order to keep the iron values in the ferric oxide reactant in the trivalent state, thereby promoting ferrite formation. Other iron oxides e.g., ferrous oxide or magnetite may be employed in place of ferric oxide since the prolonged heating in air or an oxygen-containing environment also tends to oxidize any divalent iron present to the trivalent state.

The reaction mixture is then cooled with or without annealing to below its crystallization temperature, ca. 480° C. The cooling must be rapid enough to avoid devitrification. The melt is usually quench-cooled to ambient temteratures by pouring onto or between heat conductive metal surfaces. Brass plates are particularly suitable for this purpose. Rapid cooling of the melt to its annealing temperature, ca. 436° C., and then slow cooling to ambient temperatures may also be employed.

On reheating of the cooled glass composition above about 480° C. lithium ferrite starts to devitrify or crystallize out from the glass composition. In addition to lithium ferrite, crystals of acmite and possibly albite form near the edges of the glass particles undergoing heat treatment. The ferrite and acmite/albite crystal phases continue to grow as the temperature is increased but the acmite/albite crystal growth is more rapid at first. The lithium ferrite crystals become visible and the much larger acmite/albite crystals begin dissolving into the glass at about 850° C. Finally, at about 920° C., the acmite/albite crystals dissolve back into the glass leaving only ferrite crystals within the glass.

The particular silicate glass employed has the following composition:

| Component: | Mole ratio |
|---|---|
| Silica | 11–13 |
| Sodium oxide | 3–4 |
| Alumina | 1.0 |

One to ten moles each of the lithium ferrite forming ingredients iron oxide and lithium oxide are added per mole of alumina present in the silicate glass composition.

My invention is further illustrated by means of the following representative lithium ferrite producing and glass forming composition:

| Component | Mole Percent | Weight Percent |
|---|---|---|
| SiO$_2$ | 65.0 | 56.10 |
| Na$_2$O | 20.0 | 17.79 |
| Fe$_3$O$_4$ | 5.0 | 16.65 |
| Al$_2$O$_3$ | 5.0 | 7.31 |
| Li$_2$O | 5.0 | 2.15 |

Batches having this composition, starting with sodium and lithium carbonate or nitrate, were mixed for five hours prior to heating. The mixed reactants were placed in alumina crucibles and heated to melting in an electric furnace at 1420° C. An oxidative atmosphere was provided by leaving the furnace door-port open open and allowing oxygen gas to flow through the furnace. The molten glass was removed from the furnace, after 6–8 hours at 1420° C., and quench-cooled by pouring between brass plates to yield irregularly shaped chips or particles of glass approximately four millimeters thick and two centimeters in diameter.

Heat-treatment was effected by placing the glass particles into a furnace preheated to the desired temperature. The glass samples were left at these temperatures in an air atmosphere for forty-eight to fifty hours and then removed and air-cooled to ambient temperature. The nature of the heat-treated samples was determined by a variety of experimental techniques during and subsequent to the heat treatment.

Differential thermal analysis showed an endothermic reaction peak during the heat treatment at 480° C., which was almost masked by a larger peak at 580° C. As a result of the studies described below, the smaller peak was attributed to the crystallization of lithium ferrite and the larger peak to the separation of a second crystalline phase from the glass. An endothermic reaction peak at 920° C. was also observed which fell off above this temperature much less rapidly than in approaching that temperature. No weight changes accompanied the reactions taking place in the composition.

Crystal formation was studied by X-ray analysis and with the aid of an optical microscope. X-ray diffractograms were made on powdered speciments with a Siemens X-ray diffractometer, using copper $K\alpha$ radiation and a nickel filter for the diffracted beam. Optical microscope specimens were prepared by imbedding a small sample in a cylindrical Lucite (polymethyl methacrylate) block and carefully polishing the sample surface prior to examination with reflected light using a Zeiss microscope.

Optical miscroscopy and X-ray diffraction patterns of samples heat-treated in the temperature range of 480° and more particularly 500° to 900° C. indicated lithium ferrite crystals growing within the glass. Observations on samples heat-treated to 800° C. and 850° C. indicated large amounts of acmite ($Na_2O \cdot Fe_2O_3 \cdot 4SiO_2$) and possibly albite, $1/2(Na_2O \cdot Al_2O_3 \cdot 6SiO_2)$ in addition to lithium ferrite ($LiFe_5O_8$). Acmite is monoclinic and albite is triclinic accounting for the variation in shapes of some of the crystals observed. Further studies showed that the acmite/albite crystals nucleate in the glass and begin to grow at 580° C. The crystals dissolve back into the incipient melting glass at 920° C. The odd shape of the endothermic reaction observed at this temperature on differential thermal analysis can be attributed to the complex reactions taking place in the glass as these crystals dissolve.

Observations with the optical microscope on the glass particle samples heat treated at 850° C. showed lithium ferrite formation on the surfaces in contact with air but not on those surfaces in contact with the crucible. In addition, substantial acmite/albite crystal growth was observed from near the surface towards the interior of the glass particles. A sharp line of demarcation was evident where acmite/albite crystal growth abruptly stopped leaving only lithium ferrite crystals within the glassy interior of the sample. The total thickness of the acmite/albite layer in the samples studied was on the order of one millimeter. Lithium ferrite-containing glass compositions, according to the present invention, may be obtained by grinding off or otherwise removing the outer acmite/albite-containing portions of the heat treated glass particles.

Acmite/albite crystal growth is further enhanced in those areas where the surfaces of the glass particles being heated are not exposed to air. The formation of such crystals depletes the amount of iron available for ferrite formation and is best avoided by effecting the heat treatment in the presence of air. Provision should be made for exposing all surfaces of the glass particles undergoing treatment to the air.

When the glass particles were heat treated above 920° C., the acmite/albite crystals redissolved in the glass leaving behind only microcrystals of lithium ferrite distributed throughout glass. X-ray diffraction patterns and optical microscope studies for a sample heat-treated at 1100° C. indicated relatively uniform crystals of lithium ferrite, average size 8 microns, fairly evenly distributed through the glass as the only crystalline phase present. These crystals redissolved into the glass as the glass approached its melting temperature. Thus, heating the glass particles above 920° C., but below the melting point of the glass, provided an alternate method for the preparation of lithium-ferrite-containing glass composition according to the present invention.

Using cobalt 57 imbedded in copper as the source, Mossbauer absorption patterns were obtained on the composition melted in oxygen and on glass particles heat-treated at 1100° C. The test samples were prepared using enriched iron (i.e., higher percent $Fe^{57}$ than normal). Measurements on the fused glass prior to heat treatment indicated that the iron in the glass was primarily in the trivalent state. The six-line hyperfine spectrum observed for the heat-treated specimen showed peaks identical to those obtained with a lithium ferrite standard.

Magnetic measurements were made on heat-treated samples. The magnetic moment per gram of bulk material was measured using an extremely sensitive magnetometer. Magnetic hysteresis properties were measured using a 9000 oersteds applied field electromagnet and measuring the current induced on placing the powdered sample into the magnetic field.

Saturation magnetization measurements were made on 850° C. and 1100° C. heat-treated samples using the standard hysteresis measurement approach. The values obtained were $B_s = 174.0$ and 138.0 gauss, respectively.

The moment/gram for a glass melted in an argon atmosphere and a powdered sample heated at 750° C. was 0.293. Such extremely low moments are characteristic of super paramagnetic materials, i.e., ferrimagnetic crystals smaller than the single domain size. A sample heat-treated at 850° C. was examined using an electron microscope. Measurements indicated an average size for the lithium ferrite crystals of 400–500 A., the size range suggested by magnetic measurements.

Similar properties were obtained with the following lithium ferrite producing and glass forming compositions:

| Component | Mole Percent | Weight Percent |
| --- | --- | --- |
| $SiO_2$ | 55 | 43.09 |
| $Fe_3O_4$ | 10 | 30.20 |
| $Al_2O_3$ | 5 | 6.65 |
| $Na_2O$ | 20 | 16.17 |
| $Li_2O$ | 10 | 3.90 |

| Component | Mole Percent | Weight Percent |
| --- | --- | --- |
| $SiO_2$ | 55 | 44.01 |
| $Fe_3O_4$ | 10 | 30.84 |
| $Al_2O_3$ | 5 | 6.79 |
| $Na_2O$ | 15 | 12.39 |
| $Li_2O$ | 15 | 5.97 |

Other variations of the invention will be apparent from the above discussion and examples. My invention is as claimed.

I claim:

1. A method for the preparation of a lithium ferrite-containing glass composition which comprises heating a mixture of silica, sodium oxide and alumina having a mole ratio of 11–13:3–4:1 and 1–10 moles each of ferric oxide and lithium oxide per mole of alumina in an oxidizing atmosphere until glass formation is substantially complete, cooling the fused glass mixture to a temperature below its crystallization point, and growing crystals of lithium ferrite within the glass by heating the glass in air at a temperature between 500 and 900° C.

2. A method according to claim 1 wherein the surface layers containing acmite crystals are removed by grinding from the resultant glass particles.

3. A method according to claim 1 wherein the resultant composition is further heated at a temperature between 920° C. and the melting point of the glass.

4. A method according to claim 1 wherein the mixture contains 65 mole percent of silica, 20 mole percent of sodium oxide, and 5 mole percent each of alumina, lithium oxide and an iron oxide.

5. A silicate glass composition consisting essentially of a silicate glass having a silica, sodium oxide and alumina mole ratio of 11–13:3–4:1 containing relatively uniformly sized microcrystals of lithium ferrite dispersed therethrough.

References Cited

UNITED STATES PATENTS 3,193,503   7/1965   Smith _____ 252—62.61 X

TOBIAS E. LEVOW, Primary Examiner

J. COOPER, Assistant Examiner

U.S. Cl. X.R.

106—39